June 8, 1965 L. S. McMILLIAN, JR 3,188,624

A/D CONVERTER

Filed Nov. 17, 1959

INVENTOR.
LONNIE S. McMILLIAN, JR.
BY
Hurvitz & Rose
ATTORNEYS

United States Patent Office 3,188,624
Patented June 8, 1965

3,188,624
A/D CONVERTER

Lonnie S. McMillian, Jr., Melbourne, Fla., assignor to Radiation, Inc., Melbourne, Fla., a corporation of Florida Filed Nov. 17, 1959, Ser. No. 853,498
20 Claims. (Cl. 340—347)

The present invention relates to analog voltage-to-digital converters and, more particularly, to an analog voltage-to-digital converter having a conversion time of approximately one microsecond.

Although there are various different basic types of analog voltage-to-digital converter, the present invention is concerned with a general type of converter as described by B. D. Smith, Jr. at the November 1955 Southeastern Instrumentation Conference of the IRE held at Atlanta, Georgia. In this type of encoder, there is provided a cascaded series of comparator-amplifiers in which the input analog voltage is provided to a comparator-amplifier in the most significant digit position of the apparatus. The input voltage is compared with a reference voltage; and if it is larger, the comparator produces a positive voltage which constitutes a digital output indicating a binary one. The voltage difference between the input voltage and reference voltage is passed on to a second comparator-amplifier where the remainder voltage is compared with a voltage equal to one-half the input voltage. A comparison is again made; and if the difference voltage is still larger than the reference voltage, a second binary one is produced; and the difference voltage is applied to the next stage of comparison and amplification. The difference voltage thus produced is then fed to a third comparator-amplifier and compared with a voltage equal to one-quarter of the reference voltage. This procedure continues throughout all stages of the comparator until the least significant digit is generated. If, at any of these stages, the analog voltage is smaller than the reference voltage or one-half or one-quarter of the reference voltage, then the comparator-amplifier produces no voltage or a negative voltage indicating a binary zero; and the analog voltage is passed on to the next comparator-amplifier without a subtraction function being performed. In this manner, a bit-by-bit conversion is effected; and the total conversion time is equal to the sum of the conversion times of the individual one-bit coders.

The difficulty with the system described above is that it is void of any timing scheme, the read-out is undefined, and the system is unstable. With regard to the latter feature, if the analog input voltage to the first stage varies during the conversion interval required for the entire unit, the decision of the first or subsequent stages may be reversed, thereby effecting reversals of the decisions of any of the following stages. Also, if the analog voltage is almost equal to the reference voltage, the system may become indecisive and produce reversals of the various decisions throughout the cascaded chain of comparator amplifiers.

In accordance with the present invention, there is provided a cascaded series of one-bit encoders with analog storage between each stage. An important factor in increasing the rate of conversion over and above that provided by the aforesaid prior art device is that, after the conversion made by each amplifier-comparator, a digital number is generated; and the remainder voltage is temporarily stored for a second comparison. Isolation between stages is provided; and this, in conjunction with the temporary storage between stages, permits each one-bit coder to accept a new analog voltage sample immediately after generating its unit of the digital code. Each one-bit encoder may operate at a one-megacycle rate; and therefore, the entire system may operate at a one-megacycle rate.

A system of this type produces a staggered code since each higher order encoder is performing a comparison upon an analog voltage applied to the apparatus one microsecond after the analog voltage upon which the next lower order encoder is operating. By employing appropriate delay lines, a completely parallel code may be generated; and, in this case, the conversion time of the apparatus is equal to one microsecond plus eight microseconds divided by the number of conversions. If the apparatus operates for as little as ten minutes, the additional time is $8\times10^{-13}$ seconds which is substantially infinitesimal compared with the one-megacycle basic rate.

The apparatus of the invention employs in each stage a comparator-amplifier which produces a positive or negative output voltage depending upon the positive or negative polarity with respect to ground of an applied voltage, an and or inhibitor gate, depending upon whether the encoder is an even or odd order stage, a capacitor, two electronic switches to be described subsequently, and an amplifier having a gain of two. Each of the items required in each stage are well known in the art, are relatively simple, have a high degree of stability, and are capable of producing a conversion at a one-megacycle rate which is accurate to $\pm.5$ percent.

It is a primary object of the present invention to provide an analog voltage-to-digital converter employing relatively simple circuit elements and which is capable of producing conversions at a one-megacycle rate and with an accuracy of $\pm.5$ percent.

It is another object of the present invention to provide an analog voltage-to-digital converter employing a plurality of cascaded, one-bit encoders having storage between each of the individual coders.

It is another object of the present invention to provide an analog voltage-to-digital converter employing a cascaded series of one-bit encoders having storage between each of the coders so that each coder is, after completing a coding function, immediately available for processing a second unit of information.

The above and still further objects, features and advantages of the present invention will become apparent upon consideration of the following detailed description of one specific embodiment thereof, especially when taken in conjunction with the accompanying drawings, wherein.

Figure 1:
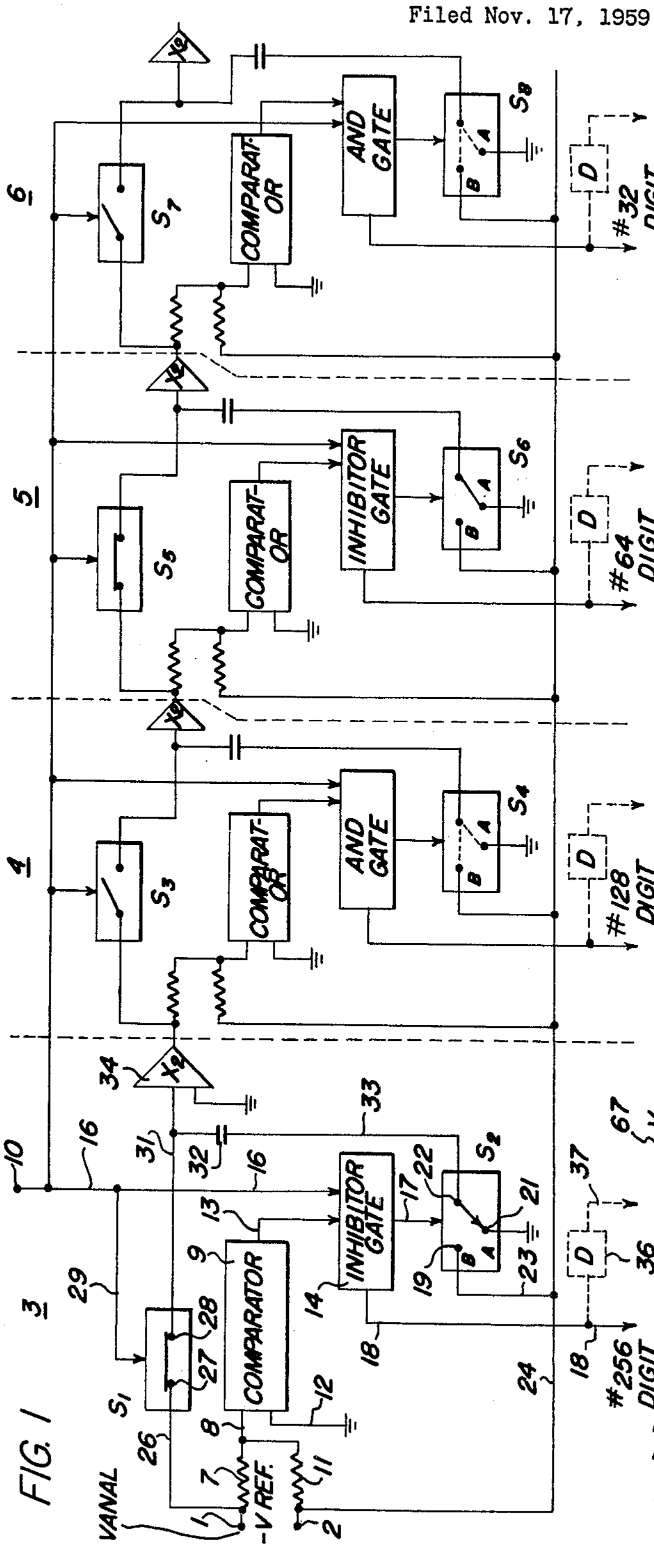
FIGURE 1 is a block diagram of a one-bit, cascaded coder in accordance with the present invention.

Referring now specifically to FIGURE 1 of the accompanying drawings, an analog input voltage is connected to an input terminal 1; and a negative reference voltage is applied to a second input terminal 2, each of these these voltages being applied between the terminal and a reference potential such as ground. If there is a possibility of a variation of the analog voltage over a one-microsecond interval, a sample and hold circuit may be employed as an input element to the converter. The encoder illustrated in FIGURE 1 comprises only four stages 3, 4, 5 and 6; each of the stages being almost identical to one another; and the only difference therebetween, as will become apparent subsequently, is the response of switches S1, and S3 to a square-wave clock pulse wave applied to a terminal 10, and the use of an inhibitor gate in the odd order stages as opposed to an and gate in the even order stages.

Proceeding with the description of the comparator-amplifier stage 3, the terminal 1 is connected through a resistor 7 to an input lead 8 of a comparator-amplifier 9. The terminal 2 is connected through a resistor 11 to the lead of the same amplifier. The comparator 9 has a second input lead 12 connected to reference potential, such as ground; and the comparator is adapted to produce a positive voltage on an output lead 13 if, and only if, the voltage on the lead 8 is positive with respect to the voltage on the lead 12. If the voltage on the lead 8 is negative with respect to the voltage on the lead 12, then a positive voltage does not appear on the output lead 13. The voltage on lead 8 is positive only if the positive voltage at terminal 1 exceeds the negative voltage on terminal 2 in absolute value, resistors 7 and 13 being equal. The output lead 13 is connected to one input circuit of an inhibitor gate 14 having an inhibitor input circuit connected via a lead 16 to the terminal 10 so that the clock pulses are applied to the gate 14. The gate 14 has a pair of output leads 17 and 18, both of which have positive voltage pulses produced thereon in response to a positive pulse on the lead 13 and no pulse on the lead 16. The gates 14 of the odd order stages are inhibitor gates while the corresponding gates of the even order stages are and gates. The lead 17 is applied as an input lead to an electronic switch S2, which is schematically illustrated as having two output terminals 18 and 21 and an input terminal 22. In the absence of a positive voltage on the lead 17, the input terminal 22 is connected to the terminal 21 which is grounded, this position being referred to hereinafter as the A position. If a positive voltage appears on the lead 17, the input terminal 22 is connected to the terminal 19, hereinafter referred to as the B position.

The terminal 19 is connected via a lead 23 to a further lead 24 connected to the terminal 2 to which the negative reference voltage is applied. The analog input voltage terminal 1 is further connected via a lead 26 to an input terminal 27 of an electronic switch S1 having an output terminal 28. The switch S1 is normally open and is closed by a clock pulse appearing at the terminal 10 and routed to the switch S1 via the lead 16 and a lead 29. The switches S1, S5, etc. of the odd order stages are closed by a clock pulse while switches S3, S7, etc. of the even order stages are opened by a clock pulse. The terminal 28 is connected via a series circuit comprising a lead 31, a storage capacitor 32, and a further lead 33 to the input terminal 22 of the switch S2. The lead 31 is also connected to an input circuit of an amplifier 34 having a gain of two. The amplifier 34 is employed to multiply the output voltage from each stage by two so that the same negative reference potential may be employed for each of the cascaded, one-bit encoders rather than having to divide the reference voltage to each of the stages by two. This improves the accuracy of the apparatus and is found also to simplify the circuits.

This completes the circuitry of each stage of coding except that, if it is wished to produce a parallel rather than serial output code, the output lead 18 of the gate 14, which also constitutes the output lead of the coder stage in the serial code generating apparatus, may be connected through an appropriate delay line 36 to an output terminal 37 so that the pulses from each of the one-bit encoders occur simultaneously.

In operation, and reference is now made to FIGURE 1 of the accompanying drawings and the table below, a one-megacycle square wave having a 50 percent duty cycle is applied to the input terminal 10 during the interval from 0 to ½ microsecond.

*Table*

| | S1 | S2 | S3 | S4 | S5 | S6 |
|---|---|---|---|---|---|---|
| t0–t½ | Closed | Position A. | Open | Position A or B | Closed | A. |
| t½–t1 | Open | A or B | Closed | A | Open | A or B. |
| t1–t1½ | Closed | A | Open | A or B | Closed | A. |
| t1½–t2 | Open | A or B | Closed | A | Open | A or B. |
| t2–t2½ | Closed | A | Open | A or B | Closed | A. |

The positive pulse appearing at the terminal 10 is applied via leads 16 and 29 to the switches S1, S3, S5, S7, etc., and closes the switches S1, S5, etc., of the odd order stages and opens the switches S3, S7, etc., of the even order stages. Taking the stage 3 as typical of the odd stages and the stage 4 as typical of the even stages, in the ensuing description, the analog voltage appearing at the terminal 1 is applied via switch S1 to the capacitor 32, which, during this interval, is returned to ground through the switch S2. Therefore, the capacitor 32 charges approximately to the value of the analog input voltage. At the end of the first half microsecond, the switch S1 is open so that the capacitor is now isolated from the input voltage. If the analog input voltage is larger than the reference voltage, a positive voltage appears on the output lead 13 of the comparator 9 and during the interval from one half microsecond to one microsecond, the voltage pulse is removed from the lead 16; and therefore, the inhibitor gate 14 may pass the positive voltage on the lead 13 to the lead 17. A positive voltage on the lead 17 causes the switch S2 to switch to its B position, to provide a connection between terminals 22 and 19; and the lower plate of the capacitor 32 is connected to the lead 24 on which the negative reference potential appears. During this second interval, therefore, the capacitor 22 applies the sum of the analog input voltage and the reference voltage to the multiply-by-two amplifier 34. Also a positive voltage appears on the output lead 18 of the inhibitor gate 14, which lead also serves as an output lead of this encoder stage, and a binary one is generated in the most significant digit of the coder.

If the analog voltage is smaller than the reference voltage, a positive voltage does not appear on the output lead 13, and the switch S2 remains in its A position. Therefore, the voltage across the capacitor 32 remains equal to the analog input voltage and this voltage is applied to the amplifier 34. Further, a positive voltage does not appear on the lead 18 and a binary zero is produced by this stage of the coder.

During the second interval from one half to one microsecond, the switch S1 is open and the switch S3 is closed, while the switch S4 is in its A position. Therefore, the storage capacitor 32' of the second stage 4 is changed to the value of the output voltage from the amplifier 34. The voltage from the amplifier 34 is also applied to the comparator 9' of the stage 4 and if it is larger than the reference voltage a positive voltage appears on its output lead 13'. This lead is connected to and gate 14' of the stage 4 which occupies the same position as the inhibitor gate 14 of stage 3. The positive voltage on lead 13' opens the and gate and during the interval from one to one and one-half microseconds the clock pulse applied to terminal 10 is gated to switch S4 which assumes its B position. Concurrently the clock pulse opens switch S3 so that the upper plate of the capacitor is isolated from the amplifier 34 and the capacitor assumes a charge equal to the difference between the voltage initially applied to the capacitor and the reference voltage. If the analog voltage applied to comparator 9' of stage 4 is less than the reference voltage, the clock pulse is not gated to the switch $S_4$ and the charge on the capacitor 32′ is not altered. Concurrently therewith, the switch $S_1$ is closed and the capacitor 32 of stage 3 is charged to the value of the input voltage appearing on the terminal 1. Thus, the odd stages of the coder; that is, the stages 3, 5, etc., are all performing their charging and comparing functions at the same time, while concurrently therewith the even stages; that is, stages 4, 6, 8 etc., are performing a decision function.

It will be seen that each stage requires one microsecond to complete a single encoding cycle and that each stage is immediately available to perform a second conversion operation after the termination of each previous conversion operation. Thus, the basic operating rate of the apparatus is one microsecond per bit of code; and since all stages operate concurrently, the conversion rate for the entire apparatus is one code per microsecond.

The code produced is a staggered code in that the output coded information is generated concurrently from the odd stages and is interleaved on a half microsecond interval with the output coded bits from the even stages. In order to produce a parallel code, the delay lines 36 are employed. If an eight-bit code is to be generated, the delay through each delay line 36 increases by one microsecond with the significance of the digit starting with the second least significant bit. More specifically, the delay line 36 associated with the first coder stage 3 must be equal to seven microseconds, that associated with the second stage 4 six microseconds, etc.

It is apparent that the switches $S_1$ and $S_2$ and the corresponding switches in each of the other stages of the comparator must have a low, closed-circuit impedance so that substantially complete charging of the storage capacitors may be effected within a half microsecond interval and further, the switches must have a high, open-circuit impedance so as to minimize leakage from the capacitor during the half microsecond intervals when the capacitors must hold their charge.

Figure 2:
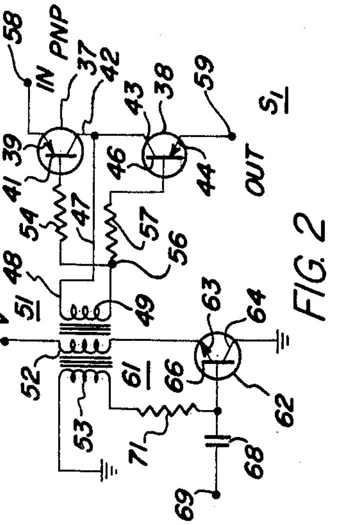
FIGURE 2 is a circuit diagram of a first switch employed in each one-bit coder of the present invention.

Referring now specifically to FIGURE 2 of the accompanying drawings, there is illustrated a switch which may be employed as the switches $S_1$, $S_3$, $S_5$, etc. The switch $S_1$ comprises PNP transistors 37 and 38 connected back-to-back. The transistor 37 comprises an emitter electrode 39, a base electrode 41 and a collector electrode 42, while the transistor 38 comprises a collector electrode 43, an emitter electrode 44 and a base electrode 46. The collector electrodes 42 and 43 of the transistors 37 and 38 are connected together and are connected via a lead 47 to an upper terminal 48 of a secondary winding 49 of a transformer 15 having a primary winding 52 and another secondary winding 53. The base electrode 41 of the transistor 37 is connected via a resistor 54 to a lower terminal 56 of the transformer secondary winding 39 while the base electrode 46 of the transistor 38 is connected via a resistor 57 to the terminal 56 of the winding 49. The emitter electrode 39 of transistor 37 is connected to an input voltage terminal 58 while the emitter electrode 44 of the transistor 38 is connected to an output terminal 59. The terminals 58 and 59 of the switch of FIGURE 2 correspond to the terminals 27 and 28 of FIGURE 1. The transistors 37 and 38 and the associated circuits described constitute a switch which is open when a voltage is developed across the secondary winding 49 of the transformer 51 which renders the terminal 48 of this winding negative. In a typical circuit, the closed-circuit impedance of the two series connected transistors 37 and 38 is between 20 to 50 ohms and is approximately 50 megohms in the open circuit condition. The gate is driven by a blocking oscillator 61 comprising a transistor 62 having an emitter electrode 63, a collector electrode 64 and a base electrode 66. The emitter electrode 63 is returned to a supply voltage terminal 67 via the primary winding 52 of the transformer 51, the collector electrode 64 is connected to ground, and the base electrode is connected via a coupling capacitor 68 to an input terminal 69. The terminal 69 is connected to the lead 29 of FIGURE 1 if the switch is employed in the first stage of the converter. The base electrode 66 of the transistor 62 is connected to ground via a series circuit comprising a resistor 71 and the secondary winding 53 of the transformer 51.

Upon the application of an input pulse to the terminal 69, the blocking oscillator 61 is rendered conductive and a negative voltage is developed at the terminal 48 of the secondary winding 49 of the transformer 51, thereby opening the gate comprising the transistors 37 and 38. At the termination of the pulse, the blocking oscillator 61 becomes non-conductive and a positive voltage is developed at the terminal 48 so that the transistors 37 and 38 are rendered non-conductive. If the switch illustrated in FIGURE 2 is employed in the even number stages of the apparatus; that is, the stages 4, 6, etc., the winding 49 of the transformer 51 is reversed so that upon the application of a pulse to the input terminal 69 and conduction of the blocking oscillator 61, a positive voltage is applied to the terminal 56 of the winding 49 and the transistors 37 and 38 are rendered non-conductive. Upon collapse of the voltage in the primary winding 52 of the transformer 51 at termination of the conduction of the transistor 62, a negative voltage appears at the terminal 56 of the winding 49 and the transistors 37 and 38 are rendered conductive. Therefore, the switch illustrated in FIGURE 2 may be employed for all stages of the apparatus, the only difference between the switches employed in the different order stages being that, in the even number stages, the connections of the secondary winding 49 of the transformer 51 are reversed.

It can be shown that with the typical values of capacity of the closed-circuit impedance of the switch of FIGURE 2, of the impedance of the switch $S_2$ and of the input impedance of the analog voltage source, the time constant of the charging circuit through capacitor 32 is equal to $0.0625\times10^{-6}$ seconds which provides eight time constants for the 0.5 microsecond charging interval of the capacitor. In consequence, the capacitor 32 is charged to within 0.1 percent of the input voltage in 0.5 microsecond which is well within the resolution of the apparatus. The discharge of the capacitor 32 during one-half microsecond when the switch $S_2$ is maintained in its A position is determined primarily by the open-circuit impedance of the switch of FIGURE 2, 50 megohms and the input impedance of the amplifier 34 which may also be quite large. It can be shown that the leakage from the capacitor 32 under typical conditions is only $2\times10^{-3}$ volts and is well within the resolution of the system. If the voltage on capacitor 32 is to be altered to a value equal to the difference between the analog and reference voltages, this must be accomplished in well under one half microsecond. In consequence the circuit of the switch $S_2$ must have a low impedance in its B position.

Figure 3:
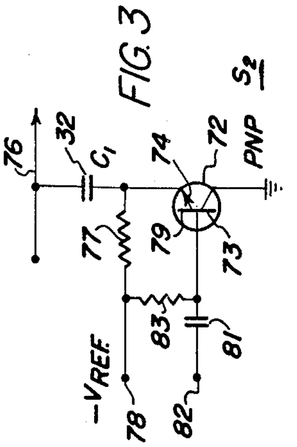
FIGURE 3 is a circuit diagram of a second switch employed in each coder of the present invention.

The switch $S_2$ and the corresponding switches $S_4$ and $S_6$ are illustrated in FIGURE 3 of the accompanying drawings. The switches employ an NPN transistor 72 as the active element. The transistor 72 has an emitter electrode 73 connected to ground and a collector electrode 74 connected to a lower plate of a capacitor 32 which is the storage capacitor for the particular stage in which the switch is to be employed. The upper terminal of the capacitor 32 is connected to a lead 76 which corresponds to the lead 31 of the first stage of the encoder. The junction of the collector 74 of the transistor 72 and the capacitor $C_1$ is connected via a resistor 77 to a terminal 78 normally connected to the negative reference voltage appearing on the lead 24 of FIGURE 1. The transistor 72 is also provided with a base electrode 79 connected to a coupling capacitor 81 to a terminal 82 adapted to receive clock pulses from the terminal 6 of FIGURE 1. The base electrode 79 of transistor 72 is also connected via a resistor 83 to the terminal 78. Normally the transistor 72 is fully conductive because of the substantially equal voltages which are applied to the emitter and base electrodes of the transistor.

Thus, in the absence of a pulse applied to the terminal 82, the lower plate of the capacitor $C_1$ is effectively connected to ground through the low impedance of the transistor. Upon the application of a positive pulse to the terminal 82, the transistor 72 is rendered non-conductive and the lower plate of the capacitor 32 is now effectively connected to the reference potential of terminal 78 via the resistor 77 which has a low impedance and therefore the capacitor 32 may rapidly assume a voltage equal to the difference between the voltage originally appearing on the capacitor and the reference voltage applied to the terminal 78.

It is not intended to limit the present invention to a system employing the switches illustrated in FIGURES 2 and 3 since other types of prior art switches may be employed to perform the required functions. The switches illustrated are intended merely as examples of acceptable circuit elements which may be employed.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An analog voltage-to-digital converter comprising a plurality of cascaded one-bit encoders, each of said encoders comprising; input means for determining the relative magnitudes of an analog input voltage and a reference voltage, means for generating a distinctive voltage indication only when a specific one of said voltages bears a predetermined relationship to the other of said voltages, means coupled to said input means for storing said analog input voltage, means for isolating said storing means from said input means upon storage of said analog input voltage, means responsive only to the generation of said voltage indication for changing said stored voltage to a value equal to a predetermined function of said input and reference voltages, means responsive to said voltage indication to produce output digits, means for connecting said input means of each lower order encoder to sense the voltage stored by said means for storing of the next higher order encoder, and means for disabling said isolating means to recouple said storing means to said input means subsequent to said sensing of said last-mentioned stored voltage.

2. An analog voltage-to-digital code converter comprising a plurality of cascaded one-bit encoders, each of said encoders comprising; input means for generating a voltage equal to the difference between an input analog voltage and a reference voltage, means for generating a distinctive voltage indication only when a specific one of said voltages is larger than another of said voltages, means coupled to said input means for storing said input voltage during a portion of a predetermined time interval, means for isolating said storing means from said input means at the conclusion of said portion of said predetermined time interval, means responsive only to the generation of said distinctive voltage indication for changing the stored voltage to a value equal to the difference between the analog and reference voltages during another portion of said predetermined time interval, means for connecting said input means of each lower order encoder to said means for storing of each higher order encoder, output means responsive to said distinctive voltage indication for producing a voltage indicative of a unit of the digital code, and means for disabling said isolating means to recouple said storing means to said input means at the conclusion of said another portion of said predetermined time interval.

3. An analog voltage-to-digital converter comprising a plurality of cascaded one-bit encoders, each of said encoders comprising; input means for determining the relative magnitudes of an analog input voltage and a reference voltage, means for generating a distinctive voltage indication only when a specific one of said voltages is larger than the other voltage, means for storing an electrical quantity proportional to said input voltage when the relative amplitudes of said input and reference voltages are of a first predetermined relation and for storing an electrical quantity proportional to the difference between said input and reference voltages when the relative amplitudes of said input and reference voltages are of a second predetermined relation, means responsive to said voltage indication to produce a coded output digital signal and means for connecting said input means of each lower order encoder to sense the electrical quantity in the storing means of the next higher order encoder.

4. An analog voltage-to-digital converter comprising a timing wave train of voltage pulses, a plurality, in excess of two, of one-bit encoders connected in cascade, each of said encoders comprising; an input terminal, input means connected to said input terminal for generating a positive voltage when said analog input voltage is larger than a reference voltage, and means for storing the analog voltage, means in the odd order encoders for connecting said means for storing to said input terminal only during each occurrence of a pulse of said wave train, means in the even order encoders for connecting said means for storing to said input terminal only during each interval between pulses of said wave train, means in the odd order encoders for altering the voltage in said means for storing to a value equal to the difference between said analog and said reference voltages in response to both the generation by said input means of a positive voltage and the absence of a pulse in said wave train, means in the even order encoders for altering the voltage in said means for storing to a value equal to the difference between said analog and said reference voltages in response to both the generation of a positive voltage by said input means and a voltage pulse of said wave train, further means connecting said input terminal of each lower order encoder to said means for storing of the next higher order encoder and output means responsive to the generation of a positive voltage by said input means for producing a positive output pulse.

5. An analog voltage-to-digital converter comprising a timing wave train of voltage pulses, a plurality, in excess of two, of one bit encoders connected in cascade, each of said encoders comprising; an input terminal, input means connected to said input terminal for generating a voltage indication when said analog input voltage is larger than a reference voltage, and means for storing the analog voltage, means in the odd order encoders for connecting said means for storing to said input terminal only during each occurrence of a pulse of said wave train, means in the even order encoders for connecting said means for storing to said input terminal only during each interval between pulses of said wave train, means in the odd order encoders for altering the voltage in said means for storing to a value equal to the difference between said analog and said reference voltages in response to both the generation by said input means of said voltage indication and the absence of a pulse in said wave train, means in the even order encoders for altering the voltage in said means for storing to a value equal to the difference between said analog and said reference voltages in response to both the generation of said voltage indication by said input means and a voltage pulse of said wave train, further means connecting said input terminal of a lower order encoder to said means for storing of the next higher order encoder and output means responsive to the generation of said positive voltage by said input means for producing an output indication.

6. The combination according to claim 5 wherein said further means comprises an amplifier having a gain of two.

7. The combination according to claim 5 wherein the reference voltage for each of said encoders is equal to the reference voltage applied to the next higher order encoder.

8. The combination according to claim 5 further comprising a plurality of output terminals, a delay line connected in series circuit between each of said output means and a different output terminal in the first through ($n$—1) stages, wherein $n$ is the number of decoder stages, each of said delay lines having a different delay time such that all output indications relating to a single input analog voltage appear at the output terminals concurrently.

9. The combination according to claim 5 wherein said reference voltage is negative and said analog voltage is positive and wherein said input means produces a positive voltage when the difference between said analog and reference voltages is positive with respect to ground potential.

10. An analog to digital converter comprising a plurality of cascaded stages, each of said stages comprising; means for producing an output signal during one portion of the converter duty cycle only when an analog input signal applied thereto exceeds a predetermined value, means for storing the analog signal during the other portion of the converter duty cycle and for storing a signal representing the difference between the analog signal and the predetermined value during said one portion of the duty cycle when the analog signal exceeds the predetermined voltage, means for coupling the signal of said storing means to the succeeding stage as the analog input signal thereto and means for isolating said first-mentioned analog signal from said storage means during said one portion of the converter duty cycle.

11. The converter of claim 10 wherein said coupling means comprises an amplifier having a gain equal to two.

12. An analog signal to digital converter comprising a plurality of cascaded stages each deriving an output signal indicative of the magnitude of a binary order, the highest order of said stages including; means for comparing the amplitude of the analog signal with a reference level, means for generating a binary one signal when said analog signal amplitude attains a predetermined value relative to said reference level, and means for storing the amplitude of said analog signal when said analog signal amplitude and said reference level are of a first predetermined relation and for storing the amplitude difference between said analog signal amplitude and said reference level when said analog signal amplitude and said reference level are of a second predetermined relation; each of said other stages including; means for comparing the amplitude of the signal stored in the storing means of the next higher order stage with a predetermined level, means for deriving a binary one signal when the amplitude of said stored signal attains a predetermined value relative to said predetermined level, and means for storing the amplitude in the storing means of the next highest order stage when the amplitude in the storing means of the next highest order and said predetermined level are of a first predetermined character, and for storing the amplitude difference between the amplitude in the storing means of the next highest order stage and said predetermined level when the amplitude in the storing means of the next highest order and said predetermined level are of a second predetermined character.

13. The converter of claim 12 wherein each of said other stages includes means for sequentially feeding the amplitude in the storing means of the next highest stage to said means for storing.

14. Apparatus for translating a variable analog signal into digitally coded signal groups, each group having a specified number of bits of consecutively decreasing significance, and each group being representative of the level of said analog signal over a predetermined time interval, said apparatus comprising a plurality of cascaded encoder stages equal in number to said specified number of bits of each group, each of said stages generating a bit of fixed significance in response to application of an analog signal thereto; each of said encoder stages of higher order than that stage for generating the least significant bit including input means and output means, means for comparing the level of an analog signal applied to said input means with a preselected reference level and for respectively producing a first signal when said applied analog signal level is greater than said reference level and a second signal when said applied analog signal level is other than greater than said reference level, means coupled to said input means for storing during one portion of said time interval a quantity of electrical energy proportional to the level of said applied analog signal, means responsive during another portion of said time interval to one of said first and second signals for maintaining the stored quantity of electrical energy and to the other of said first and second signals for varying the quantity of stored electrical energy in proportion to said reference level, further means responsive to the signal produced by said comparing means for generating a bit in accordance therewith, and means for applying the quantity of electrical energy stored during said another portion of said time interval to said output means, said output means being coupled to the input means of the next lower order encoder stage.

15. The combination according to claim 14 wherein a separate delay line is coupled to each of said bit generating means, each delay line having a delay time equal to $(n-1)t$, where $n$ is the significance of the bit, counting from least to most significance, generated by the encoder stage with which the delay line is associated and $t$ is said time interval, to produce a parallel code from said cascaded encoder stages.

16. The combination according to claim 14 wherein said coupling between said storing means and said input means includes means for isolating said storing means from said input means during said another portion of said time interval.

17. The combination according to claim 14 wherein said coupling between said storing means and said input means includes switch means selectively energized to close a conductive path therebetween during said one portion of said time interval and to open said conductive path during said another portion of said time interval, and wherein the switch means of the next lower order stage alternates between open and closed condition when said first-mentioned switch means alternates between closed and open conditions, respectively.

18. The combination according to claim 17 wherein said means responsive to said first and second signals includes further switch means coupling said storing means in conductive circuit with a datum level point, and operable only during said another portion of said time interval to couple said storing means in different conductive circuit to alter the quantity of stored electrical energy to a value proportional to the difference between said applied analog signal level and said reference level in response to said other of said first and second signals.

19. The combination according to claim 18 wherein said output means includes an amplifier having a gain of 2.

20. In an analog to digital converter for converting consecutive analog voltage samples to digital code groups, each group including a plurality of bits of differing significance, each bit having one or the other of two possible values, a plurality of cascaded one-bit encoder stages, each stage of higher order than that stage for generating the least significant bit including means for storing an analog voltage applied thereto for a portion of a predetermined time interval, means for comparing said applied analog voltage with a predetermined reference voltage, means for isolating said applied analog voltage from said storing means during another portion of said predetermined time interval, means for generating a bit representative of said comparison, means for altering said stored voltage only when said generated bit has a value equal to said one of its two possible values and means coupling said storing means to the next lower order encoder stage, so that each encoder stage accepts at least a portion of a new analog voltage sample during each said predetermined time interval, whereby said converter fully encodes an analog voltage sample in approximately one said predetermined time interval.

References Cited by the Examiner

UNITED STATES PATENTS

| | | | |
|---|---|---|---|
| 2,453,461 | 11/48 | Schelleng | 340—347 |
| 2,485,821 | 10/49 | Gloess et al. | 340—347 |
| 2,569,927 | 10/51 | Gloess et al. | 340—347 |
| 2,660,618 | 11/53 | Aigrain | 340—347 |
| 2,722,660 | 11/55 | Jones | 340—347 |
| 2,733,432 | 1/56 | Breckman | 340—347 |
| 2,754,503 | 7/56 | Forbes | 340—347 |
| 2,865,564 | 12/58 | Kaiser et al. | 340—347 |
| 2,922,151 | 1/60 | Reiling | 340—347 |
| 2,950,469 | 8/60 | Raasch | 340—347 |
| 2,969,535 | 1/61 | Foulkes | 340—347 |
| 2,970,309 | 1/61 | Towles | 340—347 |
| 3,100,298 | 8/63 | Fluhr | 340—347 |
| 3,119,105 | 1/64 | Jepperson | 340—347 |
| 3,119,992 | 1/64 | Fluegel | 340—347 |
| 3,119,993 | 1/64 | Vesper | 340—347 |

MALCOLM A. MORRISON, *Primary Examiner.*

EVERETT R. REYNOLDS, STEPHEN W. CAPELLI, *Examiners.*